United States Patent
Fujita et al.

(10) Patent No.: US 12,359,683 B2
(45) Date of Patent: Jul. 15, 2025

(54) HOLDING MEMBER WITH ACTUATOR COVER AND ACTUATOR COVER

(71) Applicant: BRIDGESTONE CORPORATION, Tokyo (JP)

(72) Inventors: Shungo Fujita, Tokyo (JP); Kentaro Yoshizawa, Tokyo (JP); Hitoshi Yasui, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 18/713,659

(22) PCT Filed: Oct. 11, 2022

(86) PCT No.: PCT/JP2022/037916
§ 371 (c)(1),
(2) Date: May 27, 2024

(87) PCT Pub. No.: WO2023/112448
PCT Pub. Date: Jun. 22, 2023

(65) Prior Publication Data
US 2025/0020147 A1    Jan. 16, 2025

(30) Foreign Application Priority Data
Dec. 17, 2021  (JP) .............................. 2021-205598

(51) Int. Cl.
*F15B 15/10*   (2006.01)
*F15B 15/20*   (2006.01)

(52) U.S. Cl.
CPC ............ *F15B 15/103* (2013.01); *F15B 15/20* (2013.01)

(58) Field of Classification Search
CPC ......... F15B 15/10; F15B 15/103; B25J 15/12; B25J 15/103; B25J 15/08
See application file for complete search history.

(56) References Cited

U.S. PATENT DOCUMENTS

| 5,014,600 A | 5/1991 | Krauter et al. |
| 11,131,329 B2 * | 9/2021 | Nakayama ............ F15B 15/103 |
| 2014/0208937 A1 * | 7/2014 | Henry ........................ F16J 3/02 29/248 |

(Continued)

FOREIGN PATENT DOCUMENTS

| JP | 4844955 | * | 6/1973 |
| JP | S4844955 A | | 6/1973 |
| JP | 61262205 A | * | 11/1986 |

(Continued)

OTHER PUBLICATIONS

Dec. 20, 2022, International Search Report issued in the International Patent Application No. PCT/JP2022/037916.

(Continued)

*Primary Examiner* — Thomas E Lazo
(74) *Attorney, Agent, or Firm* — KENJA IP LAW PC

(57) ABSTRACT

The object is to improve the durability of fluid pressure actuators. The holding member with actuator cover according to this disclosure comprises: a holding section to be attached to a fluid pressure actuator driven by fluid pressure to hold an object; and an actuator cover that covers the fluid pressure actuator while the holding section is attached to the fluid pressure actuator.

7 Claims, 10 Drawing Sheets

(56) References Cited

U.S. PATENT DOCUMENTS

2014/0360358 A1* 12/2014 Tell ........................... F16J 3/06
                                                                       92/174
2019/0168382 A1* 6/2019 Lessing ................... B25J 9/142

FOREIGN PATENT DOCUMENTS

| JP | S61262205 A |   | 11/1986 |   |   |
|----|----|----|----|----|----|
| JP | 09109078 A | * | 4/1997 |   |   |
| JP | 2009250362 A |   | 10/2009 |   |   |
| JP | 2020063768 A |   | 4/2020 |   |   |
| JP | 2021088999 A |   | 6/2021 |   |   |
| WO | WO-2019167654 A1 | * | 9/2019 | ............ | B25J 15/024 |

OTHER PUBLICATIONS

Jun. 13, 2024, International Preliminary Report on Patentability issued in the International Patent Application No. PCT/JP2022/037916.

Mar. 7, 2025, search result of the Partial Supplementary European Search Report issued by the European Patent Office in the corresponding European Patent Application No. 22906983.6.

* cited by examiner

Section A-A'

101
101a   101a1

14G
14G1

HOLDING MEMBER WITH ACTUATOR COVER AND ACTUATOR COVER

TECHNICAL FIELD

This application claims priority based on Japanese Patent Application No. 2021-205598 filed on Dec. 17, 2021, and the entire specification of this patent application is incorporated herein by reference.

The present disclosure relates to a holding member with actuator cover and an actuator cover that protects a fluid pressure actuator.

BACKGROUND

Fluid pressure actuators that use gas or liquid to expand and contract tubes have been known. For example, PTL 1 discloses a fluid pressure actuator (so-called Mckibben-type fluid pressure actuator) having a rubber tube that expands and contracts by air pressure and a sleeve that covers the outer circumferential surface of the tube.

CITATION LIST

Patent Literature

PTL 1: JP 2021-088999 A1

SUMMARY

Technical Problem

However, in the conventional fluid pressure actuators described above, the sleeve and other parts may rub against the object or dirt and moisture from the object to be held may adhere to the sleeve and other parts, adversely affecting the durability of the fluid pressure actuator, and there was room for improvement in this respect.

The purpose of the present disclosure, made in view of such circumstances, is to improve the durability of fluid pressure actuators.

Solution to Problem

This disclosure was made to solve the above technical problem, and a holding member with actuator cover according to the present disclosure comprises: a holding section to be attached to a fluid pressure actuator driven by fluid pressure to hold an object; and an actuator cover that covers the fluid pressure actuator while the holding section is attached to the fluid pressure actuator.

According to the holding member with actuator cover of the present disclosure, it is possible to prevent the fluid pressure actuator from being rubbed due to contact with an object and to prevent moisture and dirt from adhering to the fluid pressure actuator, thereby improving the durability of the fluid pressure actuator.

In the holding member with actuator cover of the present disclosure, it is preferable that the holding section can be attached to an axial tip side of a cylindrical tube, that expands and contracts, of the fluid pressure actuator, and the actuator cover covers radially outer side of the tube of the fluid pressure actuator. By adopting this configuration, the radially outer side of the fluid pressure actuator is covered with the actuator cover and the holding section is attached to the tip of the actuator, therefore, it is possible to effectively prevent the fluid pressure actuator from being rubbed due to contact with an object and to effectively prevent moisture and dirt from adhering to the fluid pressure actuator, thereby further improving the durability of the fluid pressure actuator.

In the holding member with actuator cover of the present disclosure, it is preferable that the actuator cover is integrally formed with the holding section. By adopting this configuration, the gap between the holding section and the actuator cover can be eliminated, therefore, it is possible to prevent moisture, dirt, etc. from entering through the gap between the holding section and the actuator cover and adhering to the sleeve and other parts.

In the holding member with actuator cover of the present disclosure, it is preferable that the holding section has a mounting recess into which a mounting protrusion of the fluid pressure actuator can fit. By adopting this configuration, the holding section can be easily attached to and detached from the fluid pressure actuator, therefore, maintenance can be easily performed at the timing of a change in the type of object to be held or at other times.

In the holding member with actuator cover of the present disclosure, it is preferable that the holding section has a claw for holding the object. By adopting this configuration, the claw contacts the object more strongly than other parts, thereby increasing the static frictional force with the object and more securely holding the object.

In the holding member with actuator cover of the present disclosure, it is preferable that the holding section has a holding recess for holding the object. By adopting this configuration, the holding recess which is concave in the direction away from the object is provided, and the object O can be held as if it were encased in the palm of the hand.

In addition, an actuator cover of the present disclosure comprises: a cover body that covers a fluid pressure actuator; and a holding cover section that covers a holding section attached to an axial tip side of the fluid pressure actuator to hold an object. According to the actuator cover of the present disclosure, the fluid pressure actuator and the holding section attached to the axial tip side of the fluid pressure actuator can be covered without gaps. Therefore, it is possible to prevent the fluid pressure actuator 1 from being rubbed due to contact with an object and to prevent moisture, dirt, etc. from entering through the gap between the holding cover section and the cover body and adhering to the sleeve, etc.

In the actuator cover of the present disclosure, it is preferable that the holding cover section has a thinner wall thickness than the cover body. By adopting this configuration, the shape of the holding cover section, which has a thinner wall thickness and excellent elasticity, can be easily fitted to the external shape of the holding section, which is wider than the fluid pressure actuator in the front view.

In the actuator cover of the present disclosure, it is preferable that material composing the holding cover section has a lower modulus of longitudinal elasticity than material composing the cover body. By adopting this configuration, the shape of the holding cover section, which has lower modulus of longitudinal elasticity and excellent elasticity, can be easily fitted to the external shape of the holding section, which is wider than the fluid pressure actuator in the front view.

Advantageous Effect

According to the present disclosure, it is possible to improve the durability of fluid pressure actuators.

DETAILED DESCRIPTION

Figure 1:
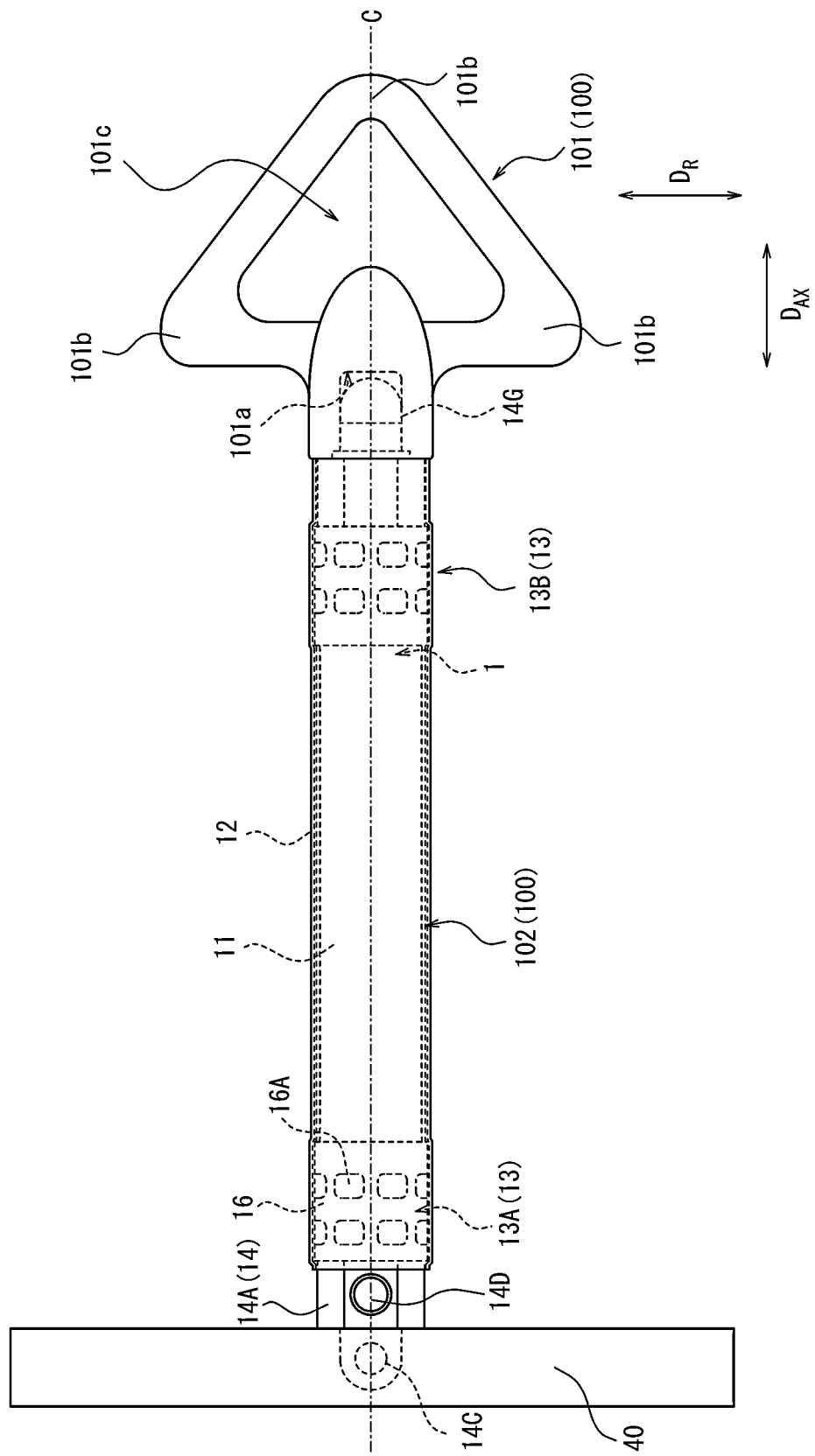
FIG. 1 is a front view of a holding member with actuator cover in accordance with one embodiment of the present disclosure.

The embodiment of the holding member with actuator cover 100 of the present disclosure is described below with reference to the drawings. In each figure, the same components are given the same reference numerals. Note, however, that the drawings are schematic, and the proportions of each dimension may differ from the reality.

(Configuration of Holding Member with Actuator Cover 100)

FIG. 1 illustrates a holding member with actuator cover 100 in accordance with one embodiment of the present disclosure attached to a fluid pressure actuator 1. The holding member with actuator cover 100 comprises a holding section 101 that is attached to the tip side of the long fluid pressure actuator 1 extending in the right and left directions in FIG. 1 to hold an object O, and an actuator cover 102 that covers the fluid pressure actuator 1 from radially outer side while the holding section 101 is attached to the fluid pressure actuator 1.

In this embodiment, the fluid pressure actuator 1 and the holding member with actuator cover 100 have their respective central axes arranged on a common axis C. In this embodiment, the holding section 101 side along this axis C (right side in FIG. 1) is the tip side, and the support section 40 side (left side in FIG. 1) is the base side. In addition, the direction orthogonal to the axis C is referred to as the radial direction, and the direction away from the axis C along a straight line orthogonal to the axis C is referred to as the radially outer side, and the direction closer to the axis C along a straight line orthogonal to the axis C is referred to as the radially inner side. In the drawings, the "axial direction" is indicated as $D_{AX}$ and the "radial direction" is indicated as DR.

In this embodiment, the holding section 101 has an abbreviated triangular shape in the front view illustrated in FIG. 1, and each vertex position of the triangle constitutes a claw 101b that is slightly oriented toward the object O to be held (toward the front side perpendicular to the paper in FIG. 1). The area surrounded by the three claws 101b in FIG. 1 constitutes a holding recess 101c, which is recessed toward the back perpendicular to the paper in FIG. 1 (see FIG. 2 for the three-dimensional shape of the holding section 101).

In this way, by comprising the claw 101b oriented toward the object O to be held, the claw 101b contacts the object O more strongly than other parts, thereby increasing the static frictional force with the object O and more securely holding the object O. In addition, by providing the holding recess 101c which is concave in the direction away from the object O, the object O can be held as if it were encased in the palm of the hand.

Figure 2:
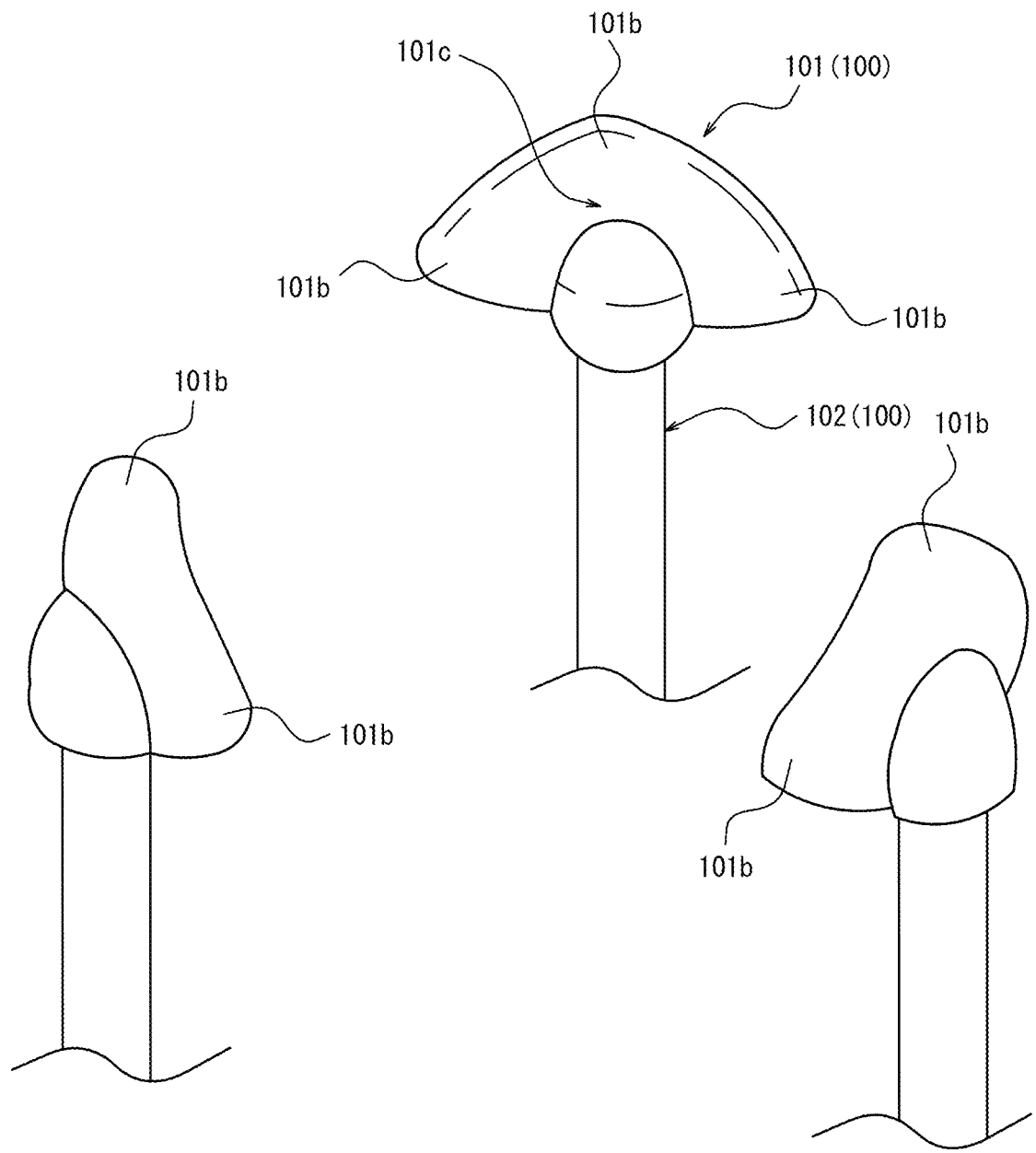
FIG. 2 is a perspective view of a holding section in the holding member with actuator cover in accordance with one embodiment of the present disclosure.

Note, that the configuration of the claw 101b is not limited to that illustrated in FIGS. 1 and 2. For example, a sharp claw 101b protruding toward the object O may be employed to bite the claw 101b into the object O to hold the object O more securely. It may also be configured without the claw 101b and/or the holding recess 101c.

In this embodiment, the actuator cover 102 has an abbreviated cylindrical shape and covers the outer circumference surface of the sleeve 12 of the fluid pressure actuator 1 (see FIG. 3, etc.) described below. The actuator cover 102 protects the fluid pressure actuator 1.

Specifically, the actuator cover 102 protects the fluid pressure actuator 1, especially the sleeve 12, from rubbing by contact with other objects.

In addition, the actuator cover 102 is preferably able to protect the sleeve 12 from getting wet due to moisture or other factors as well as damage to the sleeve 12 caused by such rubbing. In other words, the actuator cover 102 is preferably waterproof, i.e., a material that does not allow water to pass through. Furthermore, the actuator cover 102 can be made hydrophobic or water-repellent to further enhance the waterproofing effect.

More specifically, the actuator cover 102 is preferably made of a material that is scratch resistant, waterproof, weather resistant, and heat resistant to protect the sleeve 12.

Furthermore, the actuator cover 102 preferably has a sufficiently small modulus of elasticity (modulus of longitudinal elasticity) so as not to interfere with the change in shape of the fluid pressure actuator 1. Specifically, the modulus of elasticity of the actuator cover 102 is preferably less than that of the sleeve 12.

In this embodiment, the holding member with actuator cover 100 is formed by elastic materials such as silicone rubber, urethane rubber, chloroprene rubber, acrylonitrile butadiene rubber, ethylene propylene rubber, ethylene propylene diene rubber, fluorine rubber, and natural rubber. By using these materials, the holding section 101 can hold the object to be held without damaging it, and the actuator cover 102 is less likely to interfere with the deformation of the fluid pressure actuator 1.

The holding member with actuator cover 100 can be integrally formed, for example, by compression molding, injection molding, or extrusion molding. By using two-color molding or insert molding, the materials of the holding section 101 and the actuator cover 102 can be optimized to be different while simultaneously integrally forming the holding section 101 and the actuator cover 102. Different materials may be used for only a part of the holding section 101. For example, the actuator cover 102 may be made of a highly stretchable material compared to the holding section 101 to improve its ability to follow the fluid pressure actuator 1. In addition, one of the rubber materials mentioned above may be used for the part of the holding section 101 that is in contact with the object O, while plastic or metal or other materials may be used for the other parts to increase rigidity.

In this specification, the claims, and the abstract, the term "integrally formed" means that a product is formed as a single piece in a mold, and includes the case that a product is formed as a single piece by insert molding, two-color molding, or other means, however, does not include the case to integrate separate parts, which are formed in separate molds, in a subsequent process that does not involve resin molding, such as bonding.

Note, that the holding section 101 and the actuator cover 102 do not necessarily need to be integrally formed at the same time. For example, the holding section 101 and the actuator cover 102, which are formed separately, may be glued or welded together to form a single unit.

The base side of the holding section 101 is preferably coupled to the tip side of the actuator cover 102 without any gap. This configuration prevents moisture, dirt, etc. from entering through the gap between the holding section 101 and the actuator cover 102 and adhering to the sleeve 12, etc.

(Schematic Configuration of Fluid Pressure Actuator)

Next, with reference to FIGS. 3 to 6, a schematic configuration of the fluid pressure actuator 1 to which the holding member with actuator cover 100 is attached in accordance with one embodiment of the present disclosure will be described.

Figure 3:
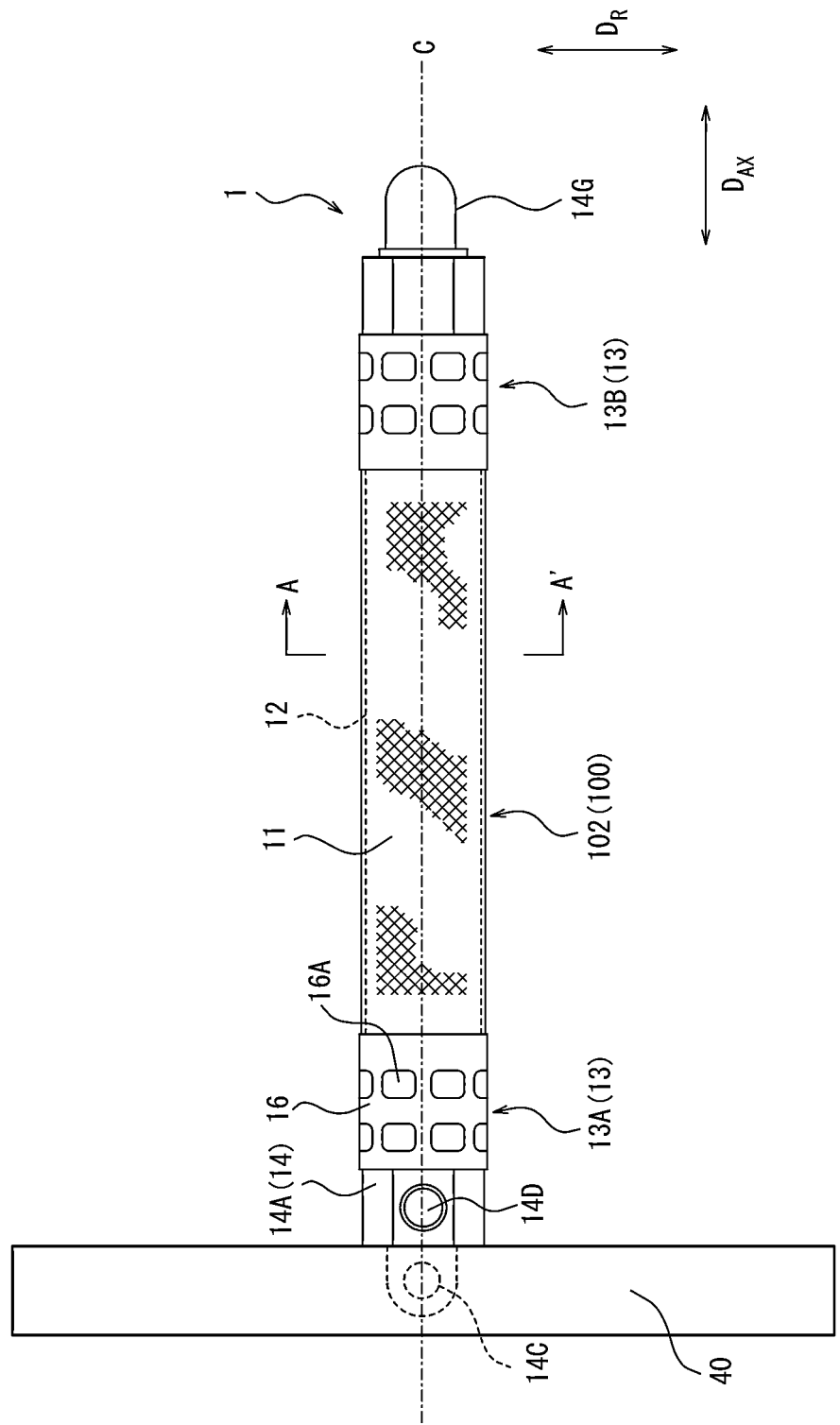
FIG. 3 is a front view of a fluid pressure actuator covered by the holding member with actuator cover in accordance with one embodiment of the present disclosure.
Figure 4:
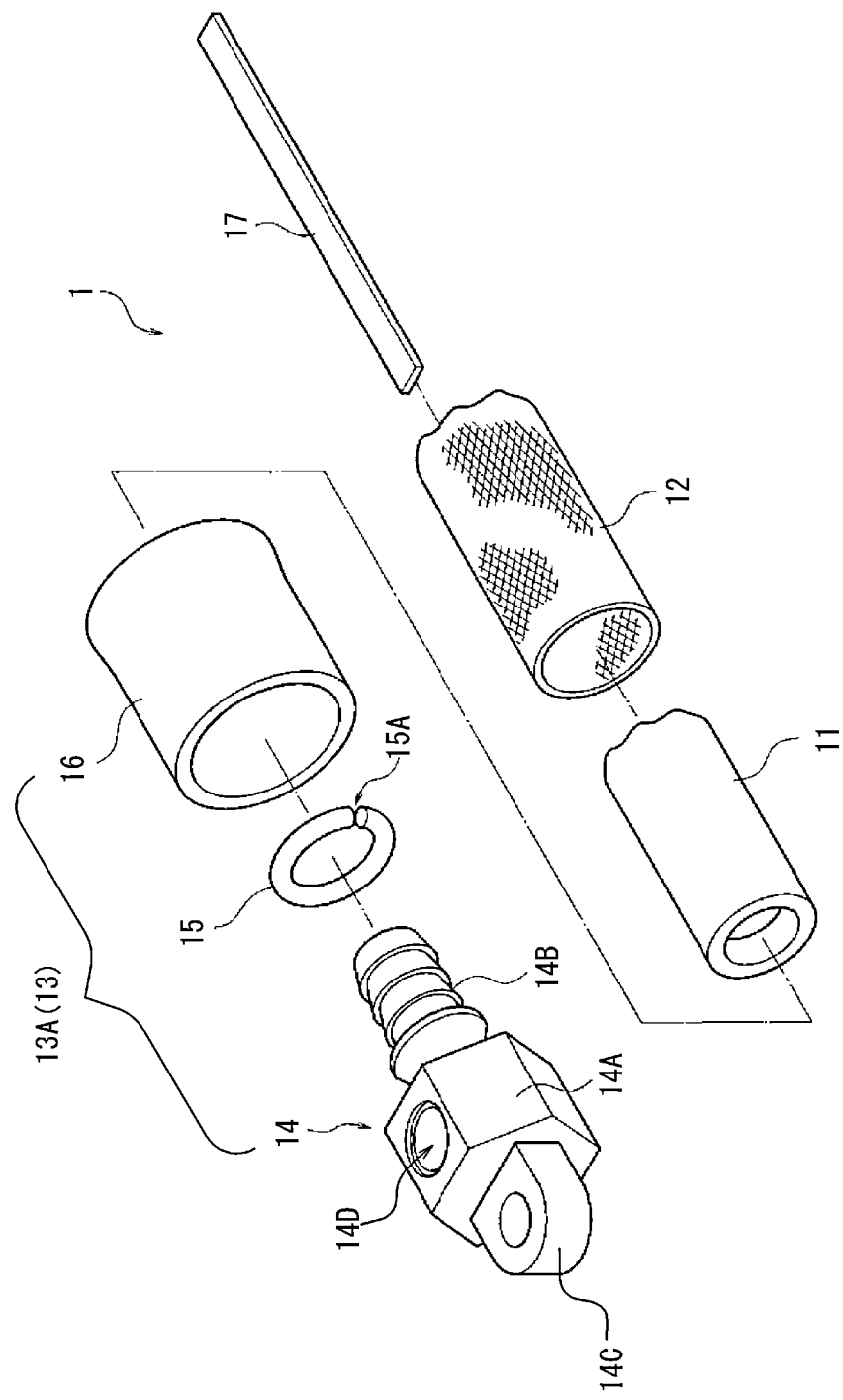
FIG. 4 is a partially exploded perspective view of the fluid pressure actuator illustrated in FIG. 3.

As illustrated in FIGS. 3 and 4, the fluid pressure actuator 1 comprises a tube 11, a sleeve 12, a first sealing section 13A, a second sealing section 13B, a mounting protrusion 14G, and a restraining member 17.

Fluid can flow into the tube 11 of the fluid pressure actuator 1 through a connection port 14D provided in the first sealing section 13A. The fluid pressure actuator 1 contracts in the axial direction and expands in the radial direction of the fluid pressure actuator 1 due to the inflow of fluid into the tube 11. On the other hand, the fluid pressure actuator 1 expands in the axial direction and contracts in the radial direction of the fluid pressure actuator 1 due to the outflow of fluid from the tube 11. In this way, the fluid pressure actuator 1 can function as an actuator by changing its shape.

Such a fluid pressure actuator 1 is the so-called Mckibben type and can be applied as an artificial muscle, as well as a body limb, hand or finger of a robot that requires higher capacity (contractile force).

The fluid used to drive the fluid pressure actuator 1 can be either a gas, such as air, or a liquid, such as water or mineral oil, but in particular, the fluid pressure actuator 1 can have high durability to withstand hydraulic drive under high pressure.

The components of the fluid pressure actuator 1 are described in detail below with reference to the drawings.

The tube 11 is a cylindrical tube that expands and contracts with fluid pressure. The tube 11 is made of elastic material, such as butyl rubber, for repeated contraction and expansion due to the fluid. However, when the fluid pressure actuator 1 is hydraulically driven, the elastic member forming the tube 11 may be NBR (nitrile rubber) with high oil resistance or at least one type selected from the group consisting of hydrogenated NBR, chloroprene rubber and epichlorohydrin rubber.

The sleeve 12 is cylindrical and covers the outer circumferential surface of the tube 11. The sleeve 12 has a stretchable structure made of woven fiber cords oriented in a predetermined direction, and the oriented cords intersect to form a repeated diamond shape. By having this shape, the sleeve 12 pantographically deforms and follows the deformation of the tube 11, regulating axial expansion of the tube 11 and allowing radial expansion of the tube 11.

Fiber cords such as aromatic polyamide (aramid fiber) or polyethylene terephthalate (PET) are preferred as the fiber cord that makes up the sleeve 12. However, the fiber cords that make up the sleeve 12 are not limited to these types of fiber cords, but may be high-strength fiber cords such as PBO fiber (polyparaphenylene benzobisoxazole), for example.

The first sealing section 13A and the second sealing section 13B seal the ends (tip side and base side) of the tube 11 in the axial direction, respectively. In this embodiment, the first sealing section 13A seals the base side of the tube 11 in the axial direction (left side in FIG. 3), and the second sealing section 13B seals the tip side of the tube 11 in the axial direction (right side in FIG. 3). In this disclosure, the first sealing section 13A and the second sealing section 13B are collectively referred to simply as "sealing section 13" when not specifically distinguished.

As illustrated in FIG. 4, the sealing section 13 (the first sealing section 13A in the illustration) includes a sealing member 14, a locking ring 15, and a caulking member 16.

The sealing member 14 seals the axial end of the tube 11. The sealing member 14 has a head part 14A and a body part 14B extending axially from the head part 14A, as illustrated in FIG. 4. The body part 14B is inserted into the tube 11 from the outer side in the axial direction of the tube 11. In addition to the head part 14A and the body part 14B, the sealing member 14 may have a coupling part 14C for coupling other members.

The coupling part 14C protrudes from the head part 14A in the axial direction opposite to the body part 14B. The coupling part 14C may have a through hole defined therein, which extends in the radial direction to facilitate coupling other members. Referring to FIG. 3, in this embodiment, a support section 40 that supports the fluid pressure actuator 1 is attached to the coupling part 14C of the first sealing section 13A. The second sealing section 13B is provided with the mounting protrusion 14G instead of the coupling part 14C, as illustrated in FIG. 3, etc. The holding section 101 is attached to the fluid pressure actuator 1 in a removable state by fitting the mounting protrusion 14G into the mounting recess 101a of the holding section 101.

The sealing member 14 is made of a metal such as stainless steel, but it is not limited to such metals and may be made of hard plastic materials.

Figure 5:
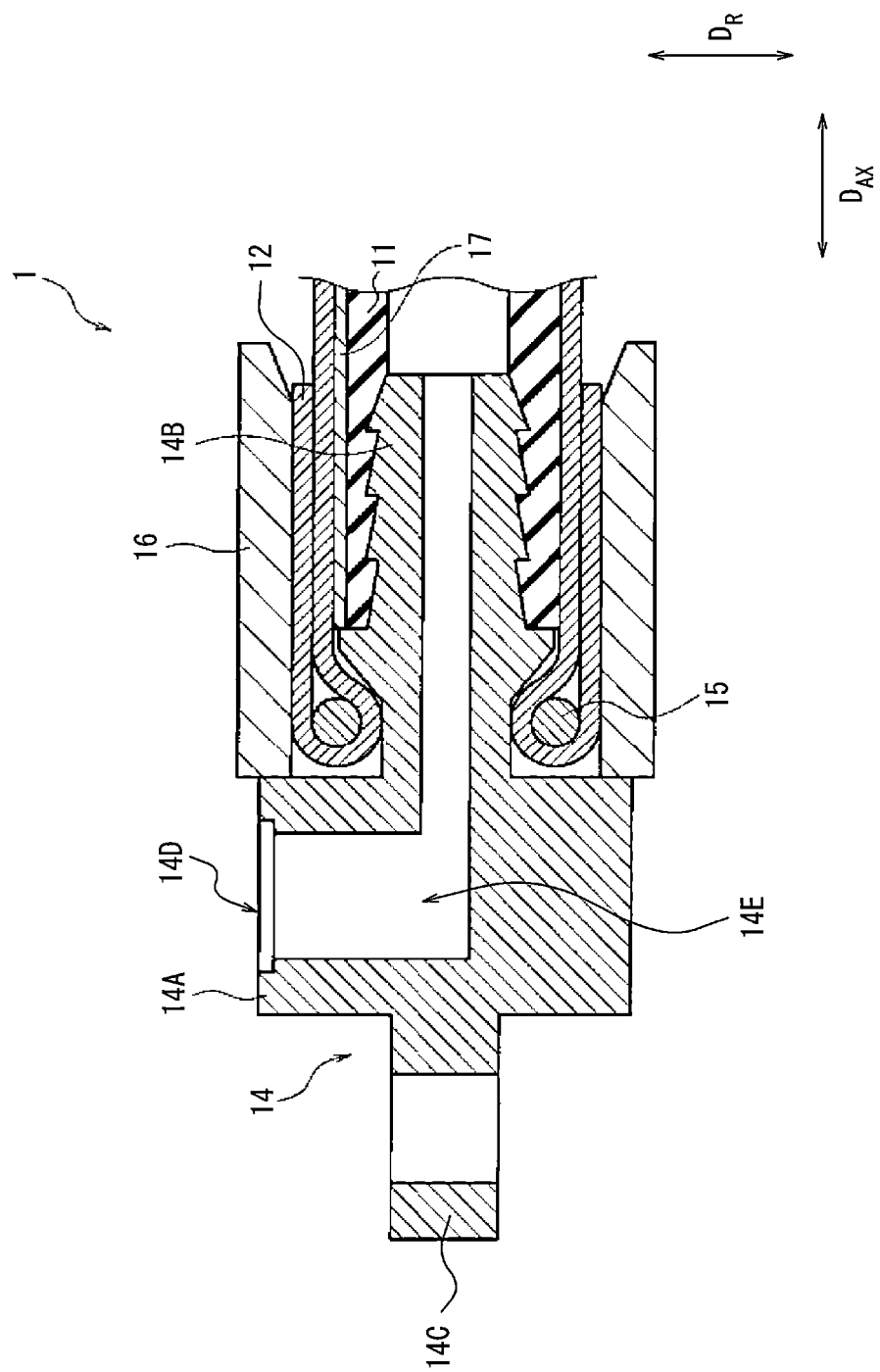
FIG. 5 is a partial cross-sectional view along the axial direction of the fluid pressure actuator including the base-side sealing section illustrated in FIG. 3.

As illustrated in FIGS. 4 and 5, the locking ring 15 is a ring-shaped member that locks the sleeve 12 to the sealing member 14. Specifically, as illustrated in FIG. 5, the sleeve 12 is folded radially outward through the locking ring 15.

As illustrated in FIG. 4, the locking ring 15 has a partially notched notch 15A to allow engagement with the sealing member 14. The locking ring 15 may be made of the same metal, hard plastic material, or other material as the sealing member 14, or of natural fibers (natural fiber threads), rubber (e.g., O-rings), or other material.

The caulking member 16 caulks the tube 11 and the sleeve 12 together with the sealing member 14. The caulking member 16 is a cylindrical member that is larger than the outer diameter of the body part 14B of the sealing member 14. The caulking member 16 is provided to cover the radially outer side of the portion of the tube 11 and the sleeve 12 into which the sealing member 14 is inserted, and is caulked by the jig to tighten the tube 11 and the sleeve 12 so as to secure them tightly to the sealing member 14.

The caulking member 16 may be constructed using a metal such as aluminum alloy, brass, or iron. As illustrated in FIG. 3, the outer circumference surface of the caulking member 16 may have an indentation 16A, which is a mark made by the jig.

The difference between the first sealing section 13A and the second sealing section 13B is whether the sealing member 14 has the connection port 14D and a passage hole 14E. As illustrated in FIG. 5, in this embodiment, the sealing member 14 at the first sealing section 13A has the connection port 14D and the passage hole 14E.

The connection port 14D is where the hose (conduit) connected to the compressor of the drive pressure source of the fluid pressure actuator 1, specifically, gas or liquid, etc., is attached. Fluid that flows in through the connection port 14D passes through the passage hole 14E defined in the interior of the sealing member 14 and flows into the interior of the tube 11. In this embodiment, the connection port 14D is provided to open toward radially outward of the head part 14A of the sealing member 14. The passage hole 14E is formed over the head part 14A and the body part 14B. The connection port 14D is connected to the inside of the tube 11 by the passage hole 14E.

Figure 6:
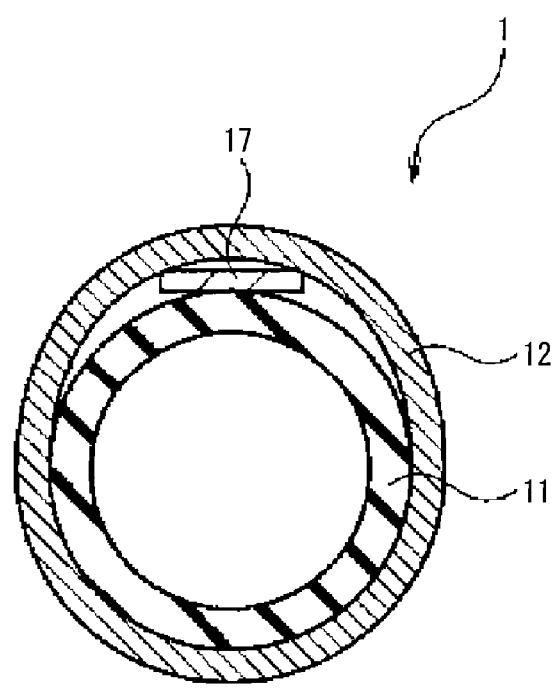
FIG. 6 is a cross-sectional view along the radial direction of the fluid pressure actuator according to the section A-A' in FIG. 3.

As illustrated in FIGS. 4 through 6, the restraining member 17 is provided on the radially inner side of the sleeve 12. The restraining member 17 is provided on the radially inner side of the sleeve 12 from the base side to the tip side in the axial direction.

The restraining member 17 does not compress in the axial direction, but is deformable only along the radial direction (also referred to as the deflection direction). In other words, the restraining member 17 resists compression along the axial direction at a predetermined position in the circumferential direction of the tube 11 and is bendable and deformable in the orthogonal direction perpendicular to the axial direction (radial direction).

The restraining member 17 also functions to restrain (regulate) the expansion of the tube 11 (and the sleeve 12) radially outward at a predetermined position in the circumferential direction of the tube 11 where the restraining member 17 is provided.

The restraining member 17 is formed, for example, using a leaf spring. The dimensions of the leaf spring should be selected according to the size of the fluid pressure actuator 1 and the required generating force, and are not limited. In addition, the material of the leaf spring is also not limited, but typically should be a material that is easy to bend and resistant to compression, such as a metal including stainless steel, etc. For example, the restraining member 17 may be made of a thin sheet of carbon fiber reinforced plastic (CFRP). Since CFRP is less susceptible to plastic deformation than metal, the fluid pressure actuator 1 easily returns to its original straight state after bending.

As illustrated in FIG. 6, the restraining member 17 is provided between the tube 11 and the sleeve 12. FIG. 6 is a cross-sectional view along the radial direction of the fluid pressure actuator according to the section A-A' in FIG. 3. The restraining member 17 may be in close contact with the tube 11 and the sleeve 12, or some gap may be formed between the restraining member 17 and the tube 11 and/or the sleeve 12 and to the sides of the restraining member 17. However, the restraining member 17 may be embedded in the tube 11 or may be provided on the radially inner side of the tube 11.

The restraining member 17 is provided on a portion of the tube 11 (and the sleeve 12) in the circumferential direction. In other words, the tube 11 has portions, in the circumferential direction, that are covered by the restraining member 17 and portions that are not covered by the restraining member 17. The width of the restraining member 17 is not particularly limited, but based on the outer diameter of the tube 11, it may be approximately half of the outer diameter.

Note, that in this embodiment, the restraining member 17 is flat, but it may be curved somewhat along the cross-sectional shape of the tube 11 and the sleeve 12 to the extent that it does not affect the way it flexes.

The restraining member 17 is provided from the base side to the tip side in the axial direction of the tube 11 and the sleeve 12. Specifically, the restraining member 17 may be provided from the first sealing section 13A to the second sealing section 13B. In this embodiment, the restraining member 17 is approximately equal in length to the tube 11.

However, the restraining member 17 need not necessarily be completely provided from the first sealing section 13A to the second sealing section 13B, and the restraining member 17 need not extend to either the first sealing section 13A or the second sealing section 13B (especially on the second sealing section 13B side, which is likely to be the free end when curved).

(Operation of Fluid Pressure Actuator)

Figure 7:
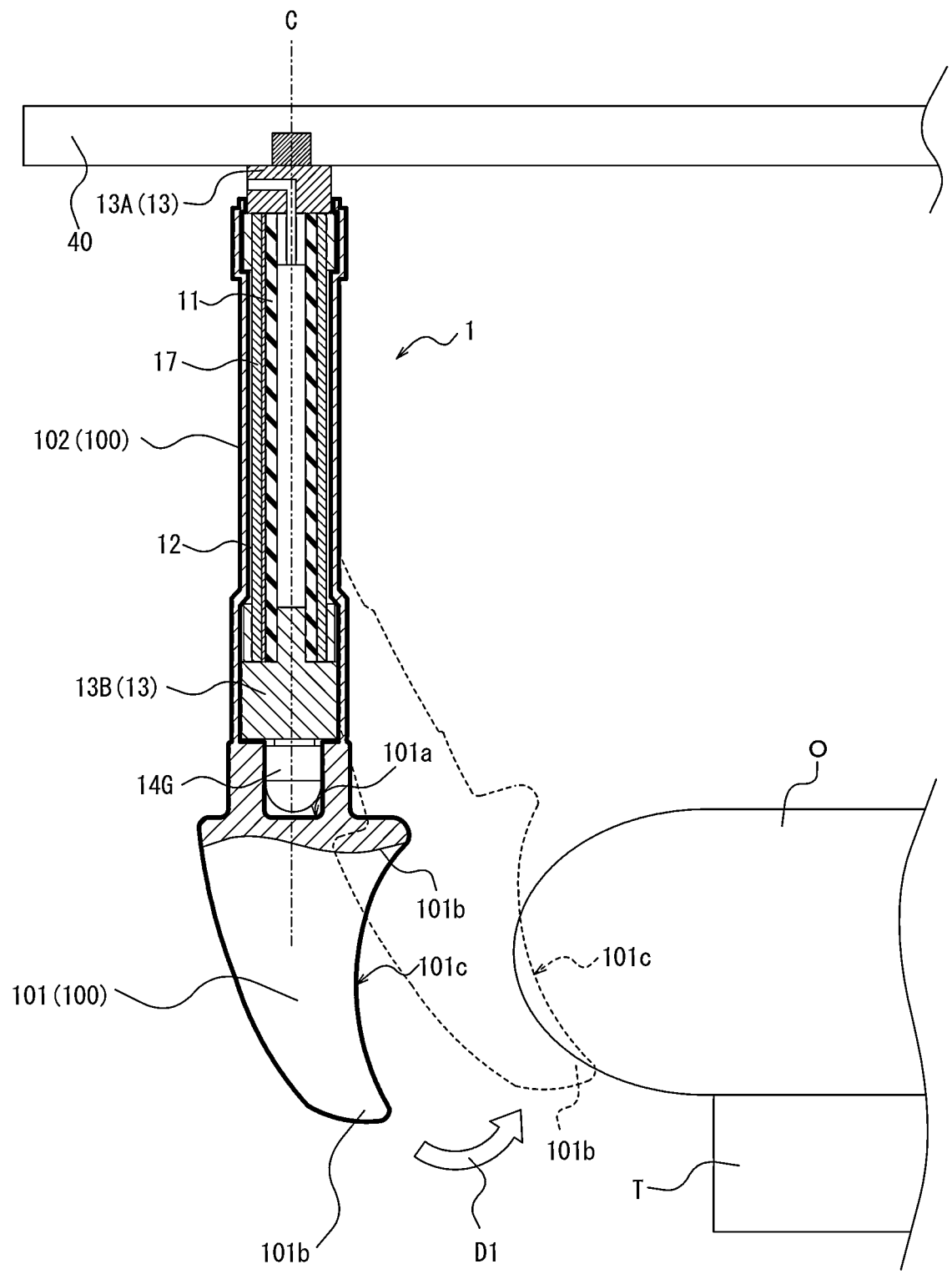
FIG. 7 illustrates the situation when fluid pressure is applied to the fluid pressure actuator to bend and deform it to hold an object.

Next, with reference to FIG. 7, the operation of the holding member with actuator cover 100 in accordance with one embodiment of the present disclosure, with the fluid pressure actuator 1 attached, will be described. In FIG. 7, the fluid pressure actuator 1 is fixed at the base side by the support section 40, and the tip side is free to move. In other words, the base side of the fluid pressure actuator 1 is the fixed end and the tip side thereof is the free end.

As in FIG. 1, the holding section 101 is mounted to the fluid pressure actuator 1 by fitting the mounting protrusion 14G on the tip side (lower side in FIG. 7) of the fluid pressure actuator 1 into the mounting recess 101A of the holding section 101. At the base side of the holding section 101, the actuator cover 102 extends along the fluid pressure actuator 1 toward the base side and covers a portion of the first sealing section 13A.

FIG. 7 illustrates only one fluid pressure actuator 1 and one holding member with actuator cover 100 that covers it. However, as illustrated in FIG. 2, for example, a plurality of fluid pressure actuators 1 and holding member with actuator covers 100 may be arranged so that the holding recesses 101c are oriented inwardly.

As described above, when fluid flows into the tube 11 of the fluid pressure actuator 1, the tube 11 tries to contract in the axial direction. However, because the restraining member 17 is provided over the axial direction in a circumferential part of the tube 11, the contraction of the tube 11 along the axial direction is restrained (regulated) in the circumferential part where the restraining member 17 is provided (the left side of the axis C in FIG. 7). On the other hand, the portion of the tube 11 without the restraining member 17 (the right side of the axis C in FIG. 7) tries to contract, so the restraining member 17 acts like a backbone, and on the side opposite to the circumferential position of the tube 11 where the restraining member 17 is provided (right side in FIG. 7), the fluid pressure actuator 1 (specifically, the tube 11 and the sleeve 12) bends in the direction D1. This direction D1 is also referred to as the deflection direction.

On the other hand, when fluid flows out of the fluid pressure actuator 1, the fluid pressure actuator 1 returns to its original linear posture. This allows the fluid pressure actuator 1 to be used, for example, as a robot arm or fingers of a robot hand.

For example, as illustrated in FIG. 7, when the fluid pressure actuator 1 is driven to displace the holding section 101 toward direction D1, it can lift an object O placed on the worktable T in cooperation with other fluid pressure actuators 1 not illustrated in FIG. 7. In other words, the claw 101*b* provided on the holding section 101 and oriented to protrude slightly in the direction of the object O can contacts the object O more strongly than other parts to hold and lift the object O more securely. In addition, by providing the holding recess 101*c* which is concave in the direction away from the object O, the object O can be held as if it were encased in the palm of the hand. This configuration allows, for example, a soft and fragile object O, such as a chicken egg, to be held without damaging it.

In this embodiment, the actuator cover 102 extends along the fluid pressure actuator 1 from the base of the holding section 101 toward the support section 40 (toward the top in FIG. 7) and covers the fluid pressure actuator 1 from the outside in the radial direction. In addition, the actuator cover 102 is coupled to the base side of the holding section 101 without any gaps. This configuration prevents, when the object O illustrated in FIG. 7 being held, moisture, dirt, etc. from the object O from entering through the gap between the holding section 101 and the actuator cover 102, and adhering to the sleeve 12 and the tube 11.

The user of the fluid pressure actuator 1 can easily replace the holding member with actuator cover 100 with the most appropriate one according to the size, weight, surface condition, or placement of the object O. For example, the holding section 101 can be replaced with the one with a rigid material when the weight of the object O is large, or with the one with a larger holding area when the size of the object O is large.

During use of the fluid pressure actuator 1, dirt, etc. caused by the object O may adhere to the holding section 101 and the actuator cover 102. Therefore, if the type of the object O is changed, both the holding section 101 and the actuator cover 102 are preferably replaced with new ones. In the holding member with actuator cover 100 according to this embodiment, the holding section 101 and the actuator cover 102 are integrally formed, so the holding section 101 and the actuator cover 102 can be easily replaced at the same time. In addition, the durability of the fluid pressure actuator 1 can be improved because dirt and moisture can be prevented from entering the gap between the holding section 101 and the actuator cover 102 when the holding member with actuator cover 100 is in use.

(System with Fluid Pressure Actuator)

Figure 8:
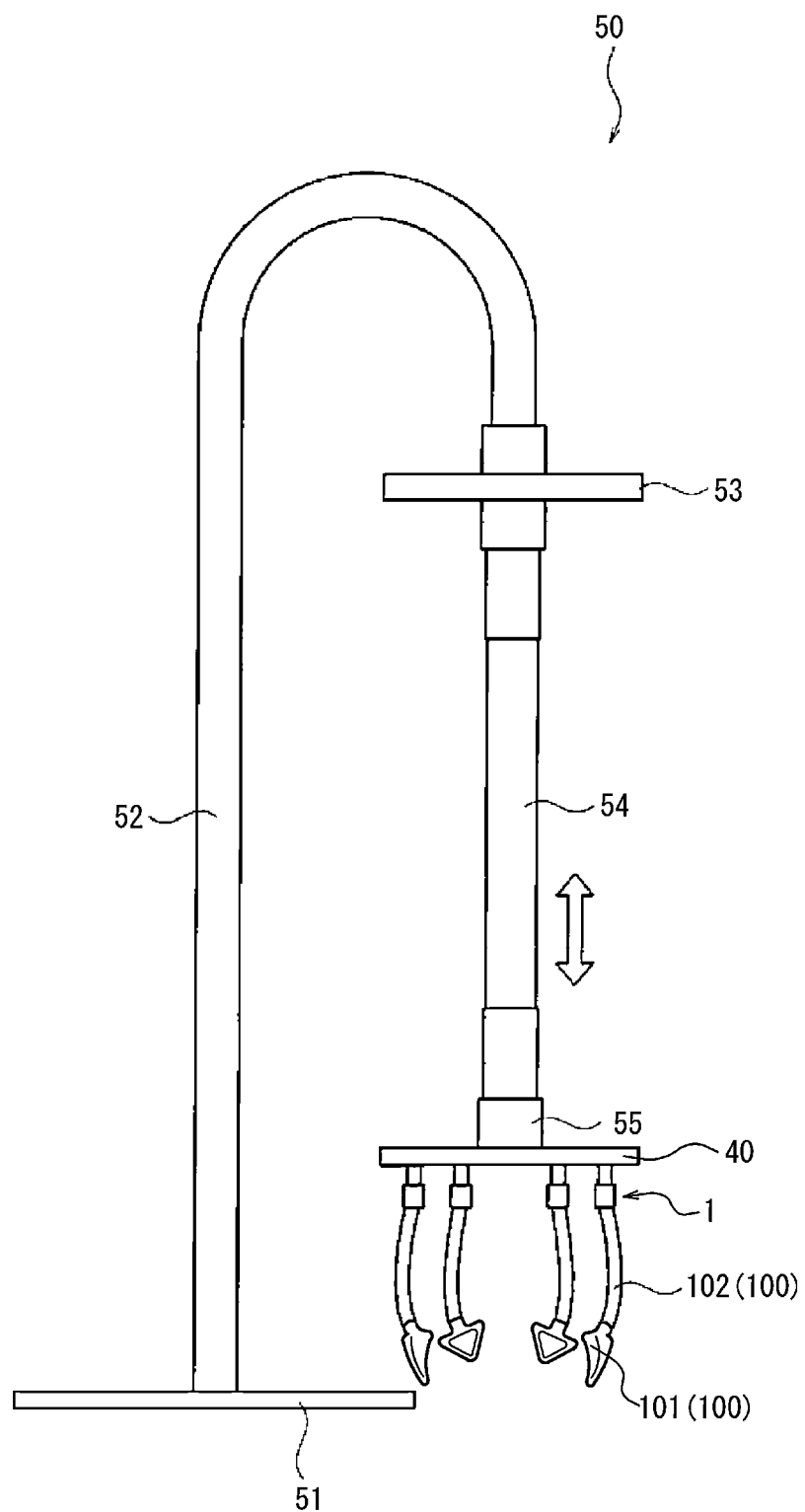
FIG. 8 is a schematic diagram illustrating an example of the configuration of a system using the fluid pressure actuator equipped with the holding member with actuator cover illustrated in FIG. 1.

Referring to FIG. 8, an example of a system using the fluid pressure actuator 1 equipped with the holding member with actuator cover 100 is described. Specifically, the system illustrated in FIG. 8 is a gripping system 50 that grips an object O by driving the fluid pressure actuator 1. Note, that in FIG. 8, the portion corresponding to the holding member with actuator cover 100 is drawn in bold line.

As illustrated in FIG. 8, the gripping system 50 comprises a pedestal section 51, a strut section 52, a first actuator connector 53, a telescopic actuator 54, a second actuator connector 55, and the fluid pressure actuator 1 equipped with the holding member with actuator cover 100.

The strut section 52 is standing on the top surface of the pedestal section 51. The upper end of the strut section 52 is folded back toward the bottom, and the first actuator connector 53 is coupled to the tip of the strut section 52.

The telescopic actuator 54 is suspended from the first actuator connector 53. The telescopic actuator 54 adjusts the vertical position of the fluid pressure actuator 1. The telescopic actuator 54 is not provided with a restraining member 17 like the fluid pressure actuator 1 described above, and can be a general Mckibben-type actuator. Thus, the telescopic actuator 54 contracts and expands along the axial direction (direction of the white arrow in the figure). In other words, the telescopic actuator 54 simply changes its axial length and cannot be curved like the fluid pressure actuator 1 with the restraining member 17 described above. However, the telescopic actuator 54 may have a restraining member 17 and be able to bend. In addition, the telescopic actuator 54 is not limited to a Mckibben-type actuator, but may be an actuator of another configuration.

The second actuator connector 55 is coupled to the lower end of the telescopic actuator 54. The fluid pressure actuator 1 is suspended from the second actuator connector 55 via the support section 40.

In the example illustrated in the figure, there are four fluid pressure actuators 1 and one support section 40 that supports the four fluid pressure actuators 1 at the base side. Each of the four fluid pressure actuators 1 is provided with a restraining member 17 spanning the axial direction of the tube 11. Each of the four fluid pressure actuators 1 has the holding member with actuator cover 100 attached to the tip side of the tube 11.

In the example illustrated in the figure, each of the four fluid pressure actuators 1 is provided with the restraining member 17 on the opposite side from the opposing fluid pressure actuator 1. This configuration allows each of the four fluid pressure actuators 1 to bend and deform toward the opposing fluid pressure actuator 1.

This allows the gripping system 50 to grasp and lift the object O by driving the telescopic actuator 54 and the fluid pressure actuator 1.

In other words, the controller that controls the gripping system 50 can control the pressure in the four fluid pressure actuators 1 to bend and deform each of the fluid pressure actuators 1 in directions that the holding sections 101 attached to the tips of each fluid pressure actuator 1 approach each other to hold the object O.

The controller may change the number of fluid pressure actuators 1 to be driven or adjust the drive pressure and the height position of the base of the fluid pressure actuators 1 according to the size and weight of the object O to be held. Alternately, the distance between the plurality of fluid pressure actuators 1 may be further adjustable so that the object O can be held in the optimal position according to its size or other factors.

Figure 9A:
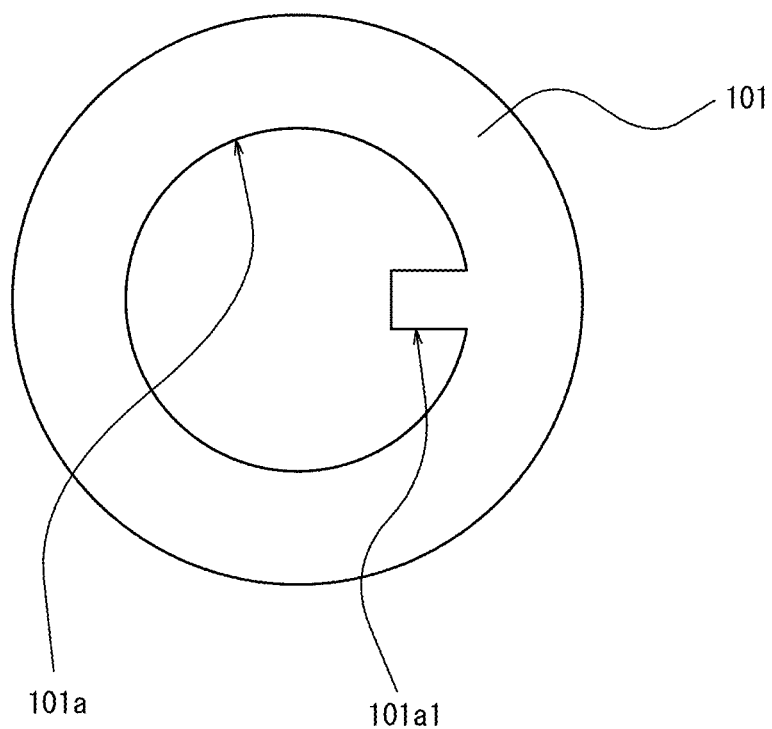
FIG. 9A illustrates a variant of the mounting recess of the holding section.
Figure 9B:
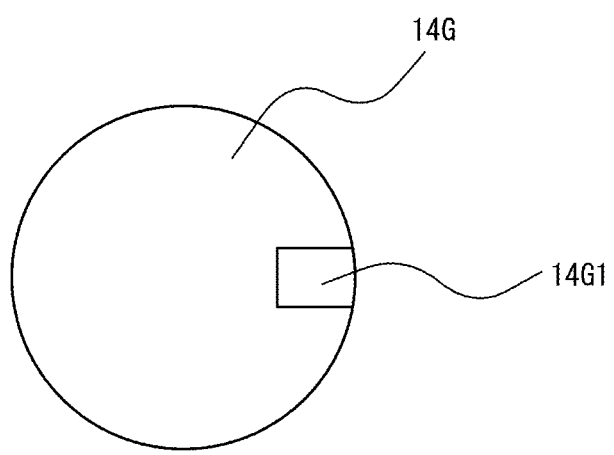
FIG. 9B illustrates a variant of the mounting protrusion of the fluid pressure actuator.

Note, that in this embodiment, as illustrated in FIG. 1, etc., the holding section 101 is attached to the fluid pressure actuator 1 by fitting the mounting protrusion 14G having approximately hemispherical tip into the cylindrical mounting recess 101*a* of the holding section 101, but this is not limited to this form. For example, a positioning protrusion 101*a*1 protruding radially inward from a circumferential portion of the mounting recess 101*a*, as illustrated in FIG. 9A (view of the holding section 101 from the mounting recess 101*a* side), fits into a positioning recess 14G1 formed in a circumferential portion of the mounting protrusion 14G as illustrated in FIG. 9B (view of the mounting protrusion 14G from the tip side), so that the rotational position of the holding section 101 with respect to the fluid pressure actuator 1 around the axis C may be determined.

According to this configuration, in the fluid pressure actuator 1 which is bendable and deformable in the opposite direction from the restraining member 17, the holding member can be mounted in such a way that the surface of the holding section 101 that is to be in contact with the object O (such as the holding recess 101c) can be oriented to the circumferential position opposite to the circumferential position of the restraining member 17. Therefore, the circumferential alignment between the bending direction of the fluid pressure actuator 1 and the surface to be in contact with the object O in the holding section 101 can be facilitated. In this case, a means may be further provided to align the circumferential position of the restraining member 17 with the rotational position of the mounting protrusion 14G. Note, that the holding section 101 side may have a positioning recess and the mounting protrusion 14G may have a positioning protrusion, as long as the rotational position of the holding section 101 with respect to the mounting protrusion 14G around the axis C is fixed in a certain direction.

As described above, the holding member with actuator cover 100 according to one embodiment of the present disclosure is configured to comprise: the holding section 101 to be attached to the fluid pressure actuator 1 driven by fluid pressure to hold the object O; and the actuator cover 102 that covers the fluid pressure actuator 1 while the holding section 101 is attached to the fluid pressure actuator 1. By adopting this configuration, it is possible to prevent the fluid pressure actuator 1 from being rubbed due to contact with the object O and to prevent moisture and dirt from adhering to the fluid pressure actuator 1, thereby improving the durability of the fluid pressure actuator 1.

In this embodiment, the holding section 101 is configured so that it can be attached to the axial tip side of the cylindrical tube 11, that expands and contracts, of the fluid pressure actuator 1, and the actuator cover 102 is configured to cover radially outer side of the tube 11 of the fluid pressure actuator 1. By adopting this configuration, that is, by covering the radially outer side of the fluid pressure actuator 1 with an actuator cover 102 and attaching the holding section 101 to the tip of the actuator, it is possible to effectively prevent the fluid pressure actuator 1 from being rubbed due to contact with the object O and to effectively prevent moisture and dirt from adhering to the fluid pressure actuator 1, thereby further improving the durability of the fluid pressure actuator 1.

In this embodiment, the actuator cover 102 is configured to be integrally formed with the holding section 101. By adopting this configuration, the gap between the holding section 101 and the actuator cover 102 can be eliminated, therefore it is possible to prevent moisture, dirt, etc. from entering through the gap between the holding section 101 and the actuator cover 102 and adhering to the sleeve 12 and other parts.

In this embodiment, the holding section 101 is configured to have the mounting recess 101a into which the mounting protrusion 14G of the fluid pressure actuator 1 can fit. By adopting this configuration, the holding section 101 can be easily attached to and detached from the fluid pressure actuator 1, therefore, maintenance can be easily performed at the timing of a change in the type of object O to be held or at other times.

In this embodiment, the holding section 101 is configured to have the claw 101b for holding the object O. By adopting this configuration, the claw 101b contacts the object O more strongly than other parts, thereby increasing the static frictional force with the object O and more securely holding the object O.

In this embodiment, the holding section 101 is configured to have the holding recess 101c for holding the object O. By adopting this configuration, that is, by providing the holding recess 101c, which is concave in the direction away from the object O, the object O can be held as if it were encased in the palm of the hand.

In this embodiment, the fluid pressure actuator 1 is configured to be bendable and deformable in a predetermined direction, and the holding section 101 is configured to have the positioning part (the positioning protrusion 101a1) for mounting the holding section 101 to the fluid pressure actuator 1 with the surface to hold the object O oriented in the predetermined direction. By adopting this configuration, the circumferential alignment between the bending direction of the fluid pressure actuator 1 and the surface to be in contact with the object O in the holding section 101 can be facilitated.

(Configuration of Actuator Cover 200)

Next, with reference to FIG. 10, an actuator cover 200 according to one embodiment of the present disclosure, which is attached to the fluid pressure actuator 1, will be described.

Figure 10:
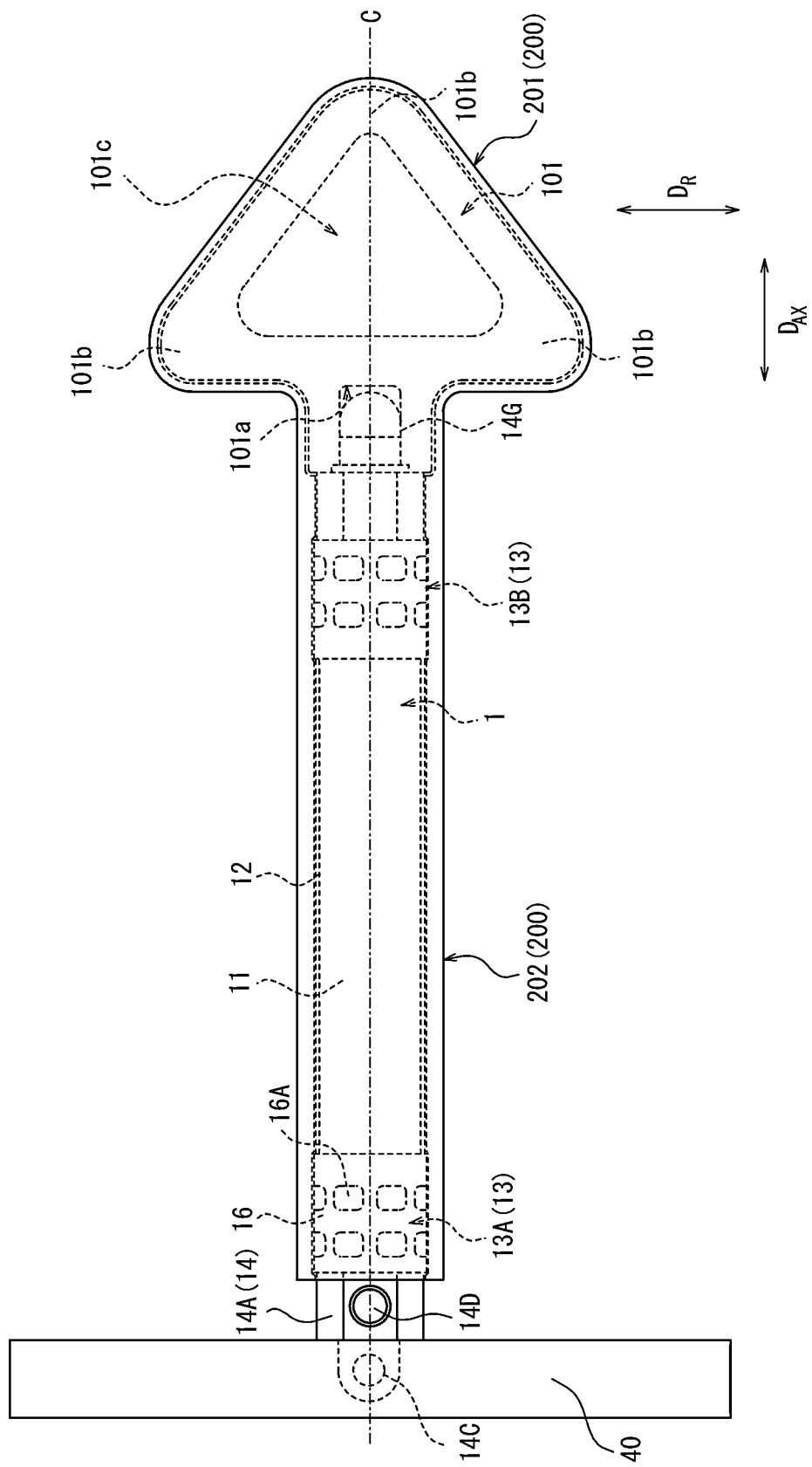
FIG. 10 is a front view of the actuator cover in accordance with one embodiment of the present disclosure.

The actuator cover 200 is a cover member that covers from the outside the long fluid pressure actuator 1 extending in the right and left directions in FIG. 10 and the holding section 101 that is attached to the tip side (right side in FIG. 10) of the fluid pressure actuator 1 to hold an object O.

In this embodiment, the fluid pressure actuator 1 and the actuator cover 200 have their respective central axes arranged on a common axis C. In this embodiment, the holding section 101 side (right side in FIG. 10) along this axis C is the tip side, and the support section 40 side (left side in FIG. 10) is the base side. In addition, the direction orthogonal to the axis C is referred to as the radial direction, and the direction away from the axis C along a straight line orthogonal to the axis C is referred to as the radially outer side, and the direction closer to the axis C along a straight line orthogonal to the axis C is referred to as the radially inner side. In the drawings, the "axial direction" is indicated as $D_{AX}$ and the "radial direction" is indicated as DR.

In this embodiment, the holding section 101 has an abbreviated triangular shape in the front view illustrated in FIG. 10, and each vertex position of the triangle constitutes a claw 101b that is slightly oriented toward the object O to be held (toward the front side perpendicular to the paper in FIG. 10). The area surrounded by the three claws 101b in FIG. 10 constitutes a holding recess 101c, which is recessed toward the back perpendicular to the paper in FIG. 10 (see FIG. 2 for the three-dimensional shape of the holding recess 101c).

In this way, by comprising the claw 101b oriented toward the object O to be held, the claw contacts the object O more strongly than other parts, thereby increasing the static frictional force with the object O and more securely holding the object O. In addition, by providing the holding recess 101c which is concave in the direction away from the object O, the object O can be held as if it were encased in the palm of the hand.

In this embodiment, unlike the holding member with actuator cover 100 illustrated in FIG. 1, the holding section 101 is not coupled to the actuator cover 200. The actuator cover 200 is configured to cover both the fluid pressure actuator 1 and the holding section 101 from the outside.

In this embodiment, as illustrated in FIG. 10, the actuator cover 200 comprises a cover body 202 that covers a fluid pressure actuator 1; and a holding cover section 201 that covers the holding section 101 to hold an object O.

The cover body 202 has an abbreviated cylindrical shape and covers the outer circumference surface of the sleeve 12 of the fluid pressure actuator 1. The cover body 202 protects the fluid pressure actuator 1.

Specifically, the cover body 202 protects the fluid pressure actuator 1, especially the sleeve 12, from rubbing by contact with other objects.

In addition, the cover body 202 is preferably able to protect the sleeve 12 not only from damage to the sleeve 12 caused by such rubbing, but also from the sleeve 12 getting wet due to moisture or other factors. In other words, the cover body 202 is preferably waterproof, i.e., a material that does not allow water to pass through. Furthermore, the cover body 202 can be made hydrophobic or water-repellent to further enhance the waterproofing effect.

More specifically, the cover body 202 is preferably made of a material that is scratch resistant, waterproof, weather resistant, and heat resistant to protect the sleeve 12.

Furthermore, the cover body 202 preferably has a sufficiently small modulus of elasticity (modulus of longitudinal elasticity) so as not to interfere with the change in shape of the fluid pressure actuator 1. Specifically, the modulus of elasticity of the cover body 202 is preferably less than that of the sleeve 12.

The holding cover section 201, when attached to the holding section 101, has a shape that follows the outline of the holding section 101, and has an abbreviated triangular shape in the front view illustrated in FIG. 10. The holding cover section 201 covers the outer circumferential surface of the holding section 101. The holding cover section 201 protects the holding section 101.

In addition, the holding cover section 201 not only protects the holding section 101, but also prevents moisture and other substances from entering between the fluid pressure actuator 1 and the cover body 202. In other words, as illustrated in FIG. 10, the holding cover section 201 and the cover body 202, which constitute the actuator cover 200, are coupled without gaps, and the holding cover section 201 completely closes the tip side of the cover body 202. This configuration prevents moisture and dirt caused by the object O from entering from the tip side (right side in FIG. 10) of the fluid pressure actuator 1 when the object O is held. The actuator cover 200 can then be replaced to remove moisture, dirt, etc. from the tip side.

Therefore, the holding cover section 201 should also be waterproof, i.e., a material that does not allow water to pass through. Furthermore, the holding cover section 201 can be provided with hydrophobic or water-repellent properties to further enhance the waterproofing effect. Note, that there may be a gap between the holding cover section 201 and the cover body 202.

In this embodiment, as illustrated in FIG. 10, the wall thickness of the holding cover section 201 is thinner than that of the cover body 202 to provide elasticity. This configuration allows the shape of the holding cover section 201 to easily fit the outline of the holding section 101, which is wider than the fluid pressure actuator 1 in the front view illustrated in FIG. 10.

In this embodiment, the actuator cover 200 can be formed by elastic materials such as silicone rubber, urethane rubber, chloroprene rubber, acrylonitrile butadiene rubber, ethylene propylene rubber, ethylene propylene diene rubber, fluorine rubber, natural rubber, etc. The use of these materials improves the gripping force on the object O by interposing the holding cover section 201, a rubber-based member, between the object O and the holding section 101. In addition, since the cover body 202 is an highly stretchable elastic member, it is less likely to interfere with the deformation of the fluid pressure actuator 1.

The actuator cover 200 can be integrally formed, for example, by compression molding, injection molding, or extrusion molding. By using two-color molding or insert molding, the materials of the holding cover section 201 and the cover body 202 can be optimized by using different materials for them while simultaneously integrally molding the holding cover section 201 and the cover body 202. For example, by using a more elastic material with a smaller modulus of longitudinal elasticity in the holding cover section 201 than in the cover body 202, the shape of the holding cover section 201 can be easily fitted to the outline of the holding section 101, which is wider than the fluid pressure actuator 1 in the front view illustrated in FIG. 10.

In addition, the shape of the actuator cover 200 when formed may be made to generally match the external shape of the fluid pressure actuator 1 and the holding section 101. This configuration allows the shape of the holding cover section 201 to be easily fitted to the outline of the holding section 101 without making the wall thickness of the holding cover section 201 thinner than that of the cover body 202 or the material of the holding cover section 201 more elastic than that of the cover body 202.

The holding cover section 201 and the cover body 202 do not necessarily need to be integrally formed at the same time. For example, the holding cover section 201 and the cover body 202, which are formed separately, can be integrated by bonding or welding.

The base side of the holding cover section 201 and the tip side of the cover body 202 is preferably coupled without gaps. This configuration prevents moisture, dirt, etc. from entering through the gap between the holding cover section 201 and the cover body 202 and adhering to the sleeve 12 and other parts.

As described above, the actuator cover 200 according to one embodiment of the present disclosure is configured to comprise the cover body 202 that covers the fluid pressure actuator 1, and the holding cover section 201 that covers the holding section 101 attached to the axial tip side of the fluid pressure actuator 1 to hold an object O. By adopting this configuration, since the fluid pressure actuator 1 and the holding section 101, which is attached to the axial tip side of the fluid pressure actuator 1, can be covered without gaps, it is possible to prevent the fluid pressure actuator 1 from contacting and rubbing against the object, and to prevent moisture, dirt, etc. from entering through the gap between the holding cover section 201 and the cover body 202 and adhering to the sleeve 12, etc.

In this embodiment, the holding cover section 201 is configured to have a thinner wall thickness than the cover body 202. By adopting this configuration, the shape of the holding cover section 201, which has a thin wall and excellent elasticity, can be easily fitted to the external shape of the holding section 101, which is wider than the fluid pressure actuator 1 in the front view.

In this embodiment, the material composing the holding cover section 201 is configured to have a lower modulus of longitudinal elasticity than the material composing the cover body 202. By adopting this configuration, the shape of the holding cover section 201, which has a small modulus of longitudinal elasticity and excellent elasticity, can be easily fitted to the external shape of the holding section 101, which is wider than the fluid pressure actuator 1 in the front view.

Although the present disclosure has been described based on the drawings and embodiments, it should be noted that one skilled in the art can make various variations and modifications based on the present disclosure. Therefore, it is noted that these variations and modifications are included in the scope of this disclosure. For example, the configuration or functions, etc. included in each embodiment can be rearranged so as not to be logically inconsistent. Also, the configuration or functions, etc. included in each embodiment can be used in combination with other embodiments, and multiple configurations or functions, etc. can be combined into one, divided, or partially omitted.

For example, the holding member with actuator cover 100 in this embodiment is configured with a holding section 101 that is triangular in shape in the front view, but is not limited to this configuration. The shape of the holding section 101 can adopt various shapes depending on the shape, size, weight, surface condition, etc. of the object O to be held.

INDUSTRIAL APPLICABILITY

The present disclosure relates to a holding member with actuator cover 100 and an actuator cover 200 to be attached to a fluid pressure actuator 1.

REFERENCE SIGNS LIST

1 Fluid pressure actuator
11 Tube
12 Sleeve
13 Sealing section
13A First sealing section
13B Second sealing section
14 Sealing member
14A Head part
14B Body part
14C Coupling part
14D Connection port
14E Passage hole
14G Mounting protrusion
14G1 Positioning recess
15 Locking ring
15A Notch
16 Caulking member
16A Indentation
17 Restraining member
40 Support section
50 Gripping system
51 Pedestal section
52 Strut section
53 First actuator connector
54 Telescopic actuator
55 Second actuator connector
100 Holding member with actuator cover
101 Holding section
101a Mounting recess
101a1 Positioning protrusion
101b Claw
101c Holding recess
102 Actuator cover
200 Actuator cover
201 Holding cover section
202 Cover body
C Axis
O Object
T Working table
D1 Deflection direction

The invention claimed is:

1. A holding member with actuator cover comprising: a holding section to be attached to a fluid pressure actuator driven by fluid pressure to hold an object; and
an actuator cover that covers the fluid pressure actuator while the holding section is attached to the fluid pressure actuator,
wherein the holding section can be attached to an axial tip side of a cylindrical tube, that expands and contracts, of the fluid pressure actuator,
the actuator cover covers a radially outer side of the tube of the fluid pressure actuator, and
the actuator cover is integrally formed with the holding section.

2. The holding member with actuator cover according to claim 1, wherein the holding section has a mounting recess into which a mounting protrusion of the fluid pressure actuator can fit.

3. The holding member with actuator cover according to claim 2, wherein the holding section has a claw for holding the object.

4. The holding member with actuator cover according to claim 2, wherein the holding section has a holding recess for holding the object.

5. The holding member with actuator cover according to claim 1, wherein the holding section has a claw for holding the object.

6. The holding member with actuator cover according to claim 1, wherein the holding section has a holding recess for holding the object.

7. The holding member with actuator cover according to claim 1, wherein the fluid pressure actuator is bendable and deformable in a predetermined direction, and
the holding section has a positioning part for mounting the holding section to the fluid pressure actuator with a surface to hold the object oriented in the predetermined direction.

\* \* \* \* \*